United States Patent

Hong

(10) Patent No.: US 12,323,864 B2
(45) Date of Patent: Jun. 3, 2025

(54) CELL RESELECTION METHOD AND APPARATUS, AND COMMUNICATION DEVICE

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 355 days.

(21) Appl. No.: 17/770,040

(22) PCT Filed: Oct. 21, 2019

(86) PCT No.: PCT/CN2019/112373
§ 371 (c)(1),
(2) Date: Apr. 18, 2022

(87) PCT Pub. No.: WO2021/077267
PCT Pub. Date: Apr. 29, 2021

(65) Prior Publication Data
US 2022/0400421 A1    Dec. 15, 2022

(51) Int. Cl.
*H04W 36/00* (2009.01)
*H04W 4/20* (2018.01)

(52) U.S. Cl.
CPC ......... *H04W 36/0061* (2013.01); *H04W 4/20* (2013.01)

(58) Field of Classification Search
None
See application file for complete search history.

(56) References Cited

U.S. PATENT DOCUMENTS

| | | | |
|---|---|---|---|
| 2018/0192445 A1 | 7/2018 | Jiang | |
| 2019/0014515 A1* | 1/2019 | Zee | H04W 36/0027 |
| 2019/0261187 A1* | 8/2019 | Chen | H04W 36/00 |
| 2019/0289528 A1* | 9/2019 | Lou | H04W 76/11 |
| 2019/0349774 A1 | 11/2019 | Lou et al. | |
| 2020/0059987 A1* | 2/2020 | Hong | H04W 36/0033 |

FOREIGN PATENT DOCUMENTS

| | | |
|---|---|---|
| CN | 106851589 A | 6/2017 |
| CN | 106879009 A | 6/2017 |
| CN | 107040481 A | 8/2017 |
| CN | 107197486 A | 9/2017 |
| CN | 108347751 A | 7/2018 |
| CN | 108702810 A | 10/2018 |
| CN | 109246775 A | 1/2019 |
| CN | 109906632 A | 6/2019 |

(Continued)

OTHER PUBLICATIONS

Shinsegi Telecomm, Inc.(TTA),"Comparison of CPM and 3GPP Schemes",TSG-RAN Working Group 1 (Radio) meeting #3, TSGR1#3(99)204,Nynäshamn, Sweden Mar. 22-26, 1999.

(Continued)

*Primary Examiner* — Brandon M Renner
(74) *Attorney, Agent, or Firm* — Arch & Lake LLP

(57) ABSTRACT

A cell reselection method, including: receiving a system message by a terminal, where the system message includes network slice information of a network slice supported by a neighbor cell; and performing cell reselection according to the network slice information.

8 Claims, 2 Drawing Sheets

(56) References Cited

FOREIGN PATENT DOCUMENTS

| JP | 2013045069 A | 3/2013 | |
|---|---|---|---|
| JP | 2018173984 A | 11/2018 | |
| WO | WO-2018030867 A1 * | 2/2018 | ........... H04B 17/318 |
| WO | WO-2018090172 A1 * | 5/2018 | ............ H04W 28/24 |
| WO | 2018219352 A1 | 12/2018 | |
| WO | WO-2018228294 A1 * | 12/2018 | ........ H04W 36/0011 |
| WO | 2019021882 A1 | 1/2019 | |
| WO | WO-2019052168 A1 * | 3/2019 | .......... H04J 11/0069 |

OTHER PUBLICATIONS

International Search Report of International Application No. PCT/CN2019/112373 dated Jul. 6, 2020 with English translation, (6p).
ZTE, Consideration on the impact of NW slicing on Ran, 3GPP TSG-RAN WG2 Meeting #97 R2-1701387, Athens, Greece, Feb. 13-17, 2017, (6 pages).
ZTE et al., Consideration on the impact of NW slicing on RAN, 3GPP TSG-RAN WG2 Meeting #95bis R2-166344, Kaohsiung, Oct. 10-14, 2016, (6 pages).

* cited by examiner

CELL RESELECTION METHOD AND APPARATUS, AND COMMUNICATION DEVICE

CROSS REFERENCE TO RELATED APPLICATION

The present application is a U.S. National Stage of International Application No. PCT/CN2019/112373, filed on Oct. 21, 2019, the entire content of which is incorporated herein by reference for all purposes.

BACKGROUND

A mobile communication technology and industry will enter into a development stage of the $5^{th}$ Generation (5G) mobile communication. 5G will meet people's needs for ultra-high traffic density, ultra-high connection density, and ultra-high mobility, and can provide users with extreme service experiences such as high-definition video, virtual reality, augmented reality, cloud desktop, and online games.

5G will penetrate into the Internet of Things and other fields, and is deeply integrated with industrial facilities, medical instruments, transportation means, etc., to effectively meet informationalized service needs of vertical industries such as industry, medical care, and transportation. It can be seen that business types, terminal types and service types that a 5G network can support in the future will be more diverse and richer than the $4^{th}$ generation (4G) mobile communication network era. For example, an Enhanced Mobile Broadband (eMBB), Massive Internet of Thing (IoT), and Mission-critical (IoT) are introduced in 5G. Furthermore, different services have different requirements for 5G network technical indicators, such as mobility requirements, billing requirements, security requirements, delay requirements, and reliability requirements.

In view of this, a technology of network slice is proposed in a 5G technology. Network slice refers to slicing of network resources. A single physical network may be divided into a plurality of logical virtual networks, and independent network slices are allocated for typical business scenarios. An enhanced network architecture is designed for business needs within a network slice to achieve just-right resource allocation and process optimization. The plurality of network slices share network infrastructure, so that network resource utilization is improved and optimal resource support is provided for different services used by different user groups.

SUMMARY

Present disclosure relates but is not limited to the technical field of wireless communication, in particular to a cell reselection method and apparatus, and a communication device.

A first aspect of the present disclosure provides a cell reselection method, including: receiving a system message by a terminal, where the system message includes network slice information of a network slice supported by a neighbor cell; and performing cell reselection by the terminal according to the network slice information.

A second aspect of the present disclosure provides a cell reselection method, including: sending a system message by a base station, where the system message includes network slice information of a network slice supported by a neighbor cell, and the network slice information is used for a terminal to perform cell reselection.

A third aspect of the present disclosure provides a communication device, including: a transceiver; a memory; and a processor, connected with the transceiver and the memory respectively, configured to control wireless signal transceiving of the transceiver and implement the aforementioned cell reselection method provided by the first aspect and/or the second aspect by executing a computer executable instruction stored on the memory.

BRIEF DESCRIPTION OF THE DRAWINGS

FIG. 4 is a schematic flow diagram of yet another cell reselection method provided by one or more examples of the present disclosure.

FIG. 5 is a schematic structural diagram of a cell reselection apparatus provided by one or more examples of the present disclosure.

FIG. 6 is a schematic structural diagram of another cell reselection apparatus provided by one or more examples of the present disclosure.

FIG. 7 is a schematic structural diagram of a terminal provided by one or more examples of the present disclosure.

FIG. 8 is a schematic structural diagram of a base station provided by one or more examples of the present disclosure.

DETAILED DESCRIPTION

Figure 1:
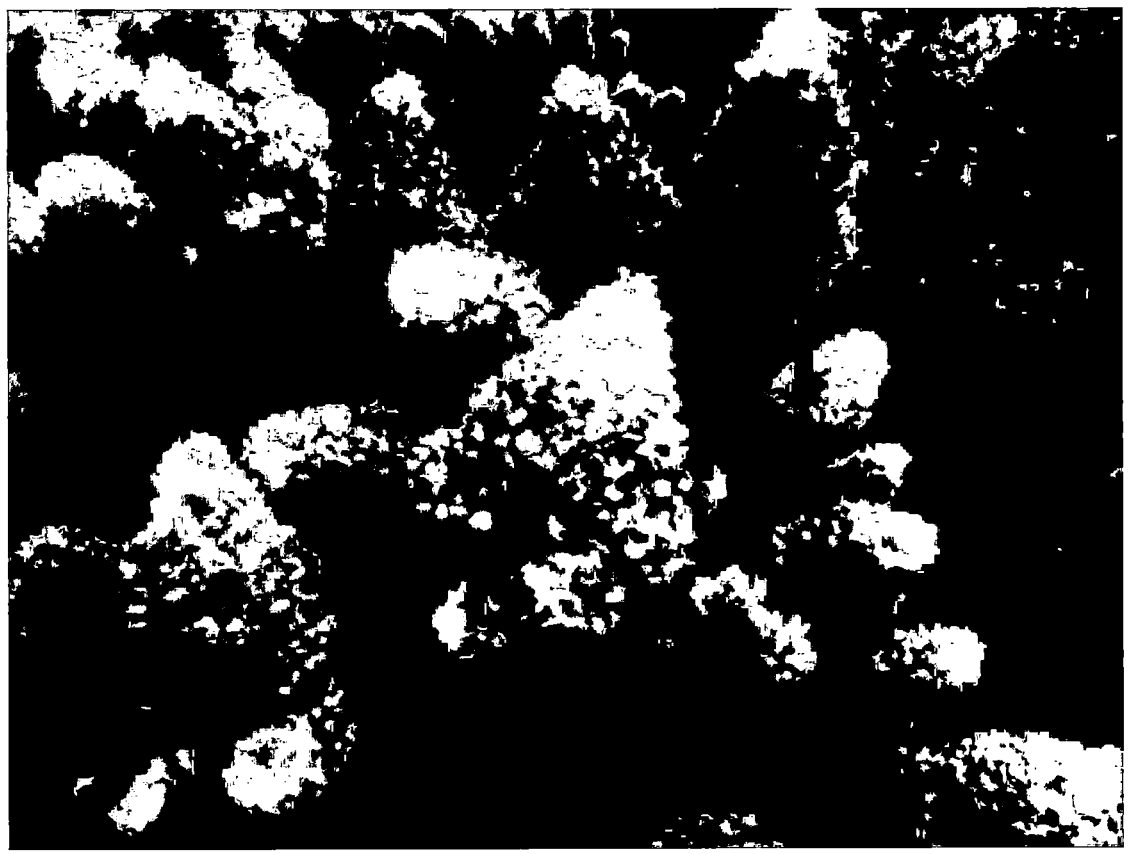
FIG. 1 is a schematic structural diagram of a wireless communication system provided by one or more examples of the present disclosure.

Reference will now be described in detail to examples, which are illustrated in the accompanying drawings. The following description refers to the accompanying drawings in which the same numbers in different drawings represent the same or similar elements unless otherwise represented. The examples described following do not represent all examples consistent with the present disclosure. Instead, they are merely examples of devices and methods consistent with aspects of the disclosure as detailed in the appended claims.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

In the related art, there are various network slices, and the network slices supported by a base station and user equipment (UE) or called a terminal may be the same or different. When a phenomenon that may occur in a specific communication process occurs, a cell or wireless network that the terminal accesses does not support the network slice that the terminal needs to access, so that technical application of the network slice is limited, and the terminal cannot obtain low-delay or high-quality communication services provided by the network slice.

A network architecture and a business scenario described by embodiments of the present disclosure are for the purpose of illustrating the technical solutions of the embodiments of the present disclosure more clearly, and do not constitute limitation to the technical solutions provided by the embodiments of the present disclosure. Those skilled in the art may know that with evolution of the network architecture and occurrence of a new business scenario, the technical solutions provided by the embodiments of the present disclosure are also applicable for the similar technical problem.

Please refer to FIG. 1, which shows a schematic structural diagram of a wireless communication system provided by an embodiment of the present disclosure. As shown in FIG. 1, the wireless communication system is a communication system based on a cellular mobile communication technology, and the wireless communication system may include: a plurality of terminals 11 and a plurality of base stations 12.

The terminal 11 may be a device that provides voice and/or data connectivity to a user. The terminal 11 may communicate with one or more core networks via a Radio Access Network (RAN), and the terminal 11 may be an Internet of Thing terminal, such as a sensor device, a mobile phone (or called a "cellular" phone) and a computer with the Internet of Thing terminal, for example, may be fixed, portable, pocket-sized, hand-held, computer-built or vehicle-mounted apparatuses. For example, the terminal 11 may be a Station (STA), a subscriber unit, a subscriber station, a mobile station, a mobile, a remote station, an access point, a remote terminal, an access terminal, a user terminal, a user agent, a user device, or user equipment (UE). Alternatively, the terminal 11 may also be a device of an unmanned aerial vehicle. Alternatively, the terminal 11 may also be a vehicle-mounted device, for example, a trip computer with a wireless communication function, or a wireless communication device externally connected to the trip computer. Alternatively, the terminal 11 may also be a roadside device, for example, may be a streetlight, a signal light, or other roadside devices with the wireless communication function.

The base station 12 may be a network-side device in the wireless communication system. The wireless communication system may be the $4^{th}$ generation mobile communication (4G) system, also known as a Long Term Evolution (LTE) system; alternatively, the wireless communication system may also be a 5G system, also known as a new radio (NR) system or a 5G NR system. Alternatively, the wireless communication system may also be a next-generation system of the 5G system. An access network in the 5G system may be called a New Generation-Radio Access Network (NG-RAN).

The base station 12 may be an evolved base station (eNB) used in the 4G system. Alternatively, the base station 12 may also be a base station (gNB) that adopts a centralized distributed architecture in the 5G system. When the base station 12 adopts the centralized distributed architecture, the base station 12 usually includes a central unit (CU) and at least two distributed units (DUs). The central unit is provided with a protocol stack of a Packet Data Convergence Protocol (PDCP) layer, a Radio Link Control (RLC) protocol layer, and a Media Access Control (MAC) layer; and the distributed unit is provided with a Physical (PHY) layer protocol stack. The specific implementation of the base station 120 is not limited in the embodiment of the present disclosure.

A wireless connection may be established between the base station 12 and the terminal 11 through a wireless air interface. In different implementations, the wireless air interface is a wireless air interface based on the $4^{th}$ generation mobile communication network technology (4G) standard; alternatively, the wireless air interface is a wireless air interface based on the $5^{th}$ generation mobile communication network technology (5G) standard, for example, the wireless air interface is a new radio; alternatively, the wireless air interface may also be a wireless air interface based on a next generation mobile communication network technology standard of 5G.

In some embodiments, an End to End (E2E) connection may also be established between the terminals 11, such as vehicle to vehicle (V2V) communication, vehicle to Infrastructure (V2I) communication, vehicle to pedestrian (V2P) communication and other scenarios in vehicle to everything (V2X) communication.

In some embodiments, the above wireless communication system may further include a network management device 13.

The plurality of base stations 12 are respectively connected with the network management device 13. The network management device 13 may be a core network device in the wireless communication system. For example, the network management device 13 may be a Mobility Management Entity (MME) in an Evolved Packet Core (EPC) network. Alternatively, the network management device may also be other core network devices, such as a Serving GateWay (SGW), a Public Data Network GateWay (PGW), a Policy and Charging Rules Function (PCRF) or a Home Subscriber Server (HSS). An implementation form of the network management device 13 is not limited in the embodiments of the present disclosure.

Figure 2:
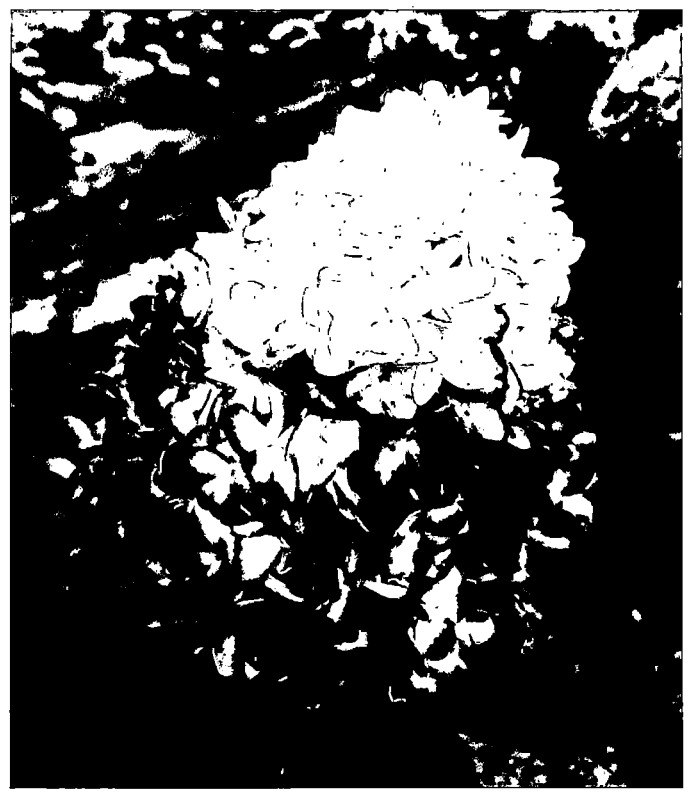
FIG. 2 is a schematic flow diagram of a cell reselection method provided by one or more examples of the present disclosure.

As shown in FIG. 2, the present embodiment provides a cell reselection method. The cell reselection method is performed by a terminal, and includes:

S210: a system message is received. The system message includes network slice information of a network slice supported by a neighbor cell; and S220: cell reselection is performed according to the network slice information.

Before the terminal switches from an idle state or an inactive state to a connected state, the terminal needs to reselect a cell for cell residence.

In the embodiment of the present disclosure, the terminal receives the system message in a process of re-accessing the cell, and the system message may be a broadcasted basic system message (Master Information Block, MIB), or may be a system message sent on demands.

The system message carries the network slice information of the network slice supported by the neighbor cell of a current cell.

In some embodiments, the network slice information may at least include: type information of the network slice supported by the neighbor cell. In other cases, the network slice information may further include other information other than the type information, for example, identification information of the network slice.

In some embodiments, the network slice information may include, but is not limited to, at least one of the followings:
the type information of the network slice, configured to indicate a type of the network slice; and
the identification information of the network slice, configured to identify the network slice, and the terminal may know the type and/or attribute of the network slice according to the identification information, and the attribute includes a supported service and/or a network segment where the network slice is located. For example, some network slices are located in a wireless network, and some network slices span the wireless network and a core network, which are end-to-end network slices of the whole network.

In this way, when receiving the system message, the terminal can read the network slice information of the network slice supported by the neighbor cell from the system message. In this way, when performing cell handover or reselection, the terminal may select the cell according to the network slice information, and access the selected cell to realize cell reselection. At this time, when the terminal performs cell reselection, since there is the network slice information of the neighbor cell of the current cell corresponding to the current location, the neighbor cell that supports the network slice wanted to be accessed by the terminal currently or supports the network slice possibly accessed by the terminal is selected as a target cell for the terminal to access. In this way, the technical solutions of the embodiments of the present disclosure reduce the phenomenon that when the terminal performs cell reselection, because the terminal does not know the network slice information of the network slice supported by neighbor cell, the terminal selects the neighbor cell that does not support the network slice wanted to be accessed or capable of being accessed by the terminal as the target cell to access; and further reduces the situation that the terminal cannot obtain the communication services with high communication quality (Quality of Service, QoS) and/or low-delay provided by the network slice in the accessed cell due to the above cell reselection phenomenon.

In some embodiments, S220 may include:
a neighbor cell having a highest type contact ratio with the network slice supported by the terminal is selected for cell reselection according to the network slice information.

Different types of network slices are defined in different communication protocols. One terminal or one base station may support the same or different types of network slices.

In order to achieve as much as possible when the terminal needs to use the network slice, the cell to which the terminal accesses can support the terminal's need of using the network slice, in the embodiment of the present disclosure, the neighbor cell having the highest type contact ratio with the network slice supported by the terminal is selected for cell reselection according to the network slice information carried by the system message.

For example, the terminal supports three types of network slices, the neighbor cells of the current cell corresponding to the terminal include a cell A and a cell B that support the network slice, and the four types of network slices supported by the cell A include the three types of network slices supported by the terminal. Each of two types of network slices supported by the cell B is the same as one of the three types of network slices supported by the terminal. In this way, the type contact ratio between the types of network slices supported by the cell A and the network slices supported by the terminal is the highest. In this way, according to the technical solutions provided by the embodiment of the present disclosure, the terminal will select the cell A as the target cell to complete cell reselection. In this way, when the terminal needs to use the network slice after accessing to the cell A, since the cell A supports all types of network slices that the terminal may use, the terminal can select arbitrarily network slice from the types of the network slices it supports to obtain communication services provided by the network slice.

In some embodiments, S120 may include: a neighbor cell with the largest number of the same type as the network slice supported by the terminal is selected for cell reselection according to the network slice information.

In the embodiment of the present disclosure, the type contact ratio may be represented by the number of types of network slices supported by neighboring cell that are the same as the types of network slices supported by the terminal.

In other embodiments, the type contact ratio may further be represented by a contact ratio value. The contact ratio value may be calculated according to the type of the network slice supported by both the neighbor cell and the terminal, and a product of an access weight. For example, both the neighbor cell and the terminal support type 1 and type 2 of the network slice.

The access weight may be predetermined, and specific reference factors for determination may be correlated with a probability value of the terminal accessing the corresponding type of network slice among the plurality of network slices supported by the terminal itself, a load ratio of the neighbor cell to the current type of network slice, and the like.

For example, the access weight may be positively correlated with the probability value of the terminal accessing the corresponding type of network slice among the plurality of network slices supported by the terminal itself; and/or, be negatively correlated with the load ratio of the neighbor cell to the current type of network slice.

That is, if the probability value of the terminal accessing the type 1 of the network slice in a historical access process is higher, then when calculating the type contact ratio value, the first type of weight corresponding to the type 1 of the network slice is higher.

If a ratio (load ratio) between an occupied capacity of the type 1 of the network slice supported by the neighbor cell and a maximum capacity supported by the corresponding neighbor cell is higher, then when calculating the type contact ratio value, the second type of weight corresponding to the type 1 of the network slice is lower.

Finally, the terminal calculates the contact ratio value with each neighbor cell, and then select the cell with the highest contact ratio value as the target cell to complete the cell reselection.

Certainly, the above only illustrates the highest type contact ratio. During specific implementation, the access weight may further be determined according to the QoS currently provided by the network slice, not limited to the above load ratio and/or the probability value of historical access.

Because the probability value of the historical access of the terminal reflects the type of network slice that the terminal is most likely to use, and the load ratio of the neighbor cell determines whether the terminal can successfully access the corresponding type of network slice to a certain extent. Calculation of the contact ratio value with reference to any of the two can further ensure that the terminal can obtain a higher quality of service of communication as much as possible while obtaining the communication service provided by the network slice.

In some embodiments, the access weight may further be correlated with a priority of the type of network slice supported by the terminal set by the terminal itself, and the higher the priority is, the greater the access weight is. For example, the terminal supports N types of network slices, and according to user instruction or communication services subscribed by the terminal, priorities are respectively configured for the N types of network slices supported by the terminal. The priority indicates that the terminal has a higher probability of using the type of network slice, the user experience is the best, or the terminal has a paid subscription, etc.

Figure 3:
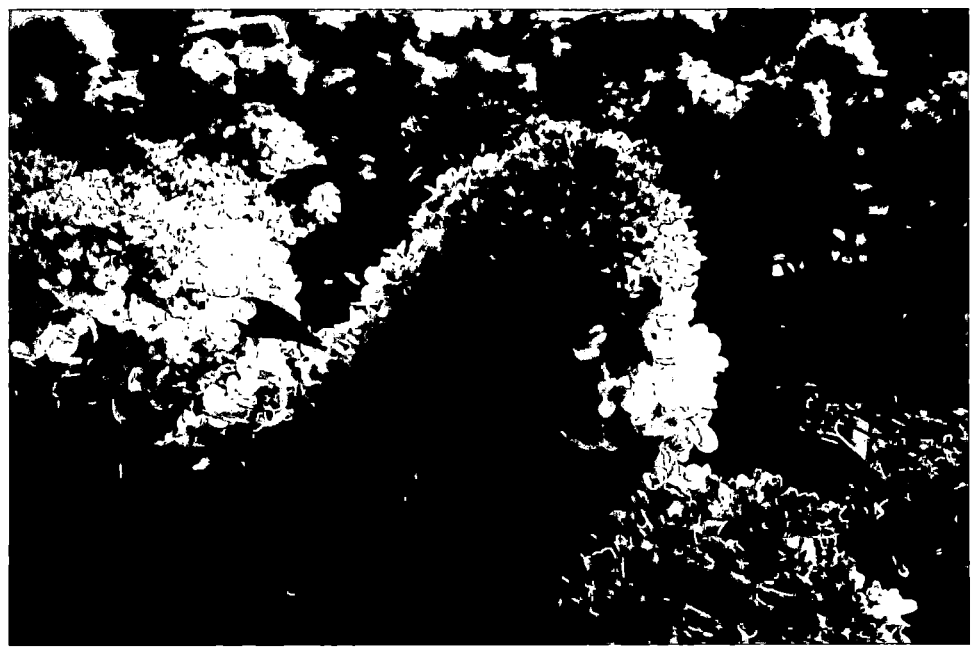
FIG. 3 is a schematic flow diagram of another cell reselection method provided by one or more examples of the present disclosure.

In some embodiments, as shown in FIG. 3, S220 may include:

S221: in response to determining that there is one neighbor cell with the largest number of the same type as the network slice supported by the terminal, the neighbor cell with the largest number of the same type as the network slice supported by the terminal is selected to perform cell reselection.

S222: in response to determining that there are more than one neighbor cell with the largest number of the same type as the network slice supported by the terminal, a neighbor cell with a best cell signal quality among the neighbor cells with the largest number of the same type as the network slice supported by the terminal is selected to perform cell reselection.

For example, among the six neighbor cells of the current cell corresponding to the terminal, there are three neighboring cells with the largest number of the same type as the network slice supported by the terminal.

At this time, the terminal will select the neighbor cell with the best cell signal quality as the target cell to complete the cell reselection.

For example, among the M cells, there are three cells with the largest number of the same type as the network slice supported by the terminal, namely the neighbor cell 1, the neighbor cell 2, and the neighbor cell 3. M is a positive integer greater than or equal to 3. At this time, the terminal will select the neighbor cell 2 with the best cell signal quality as the target cell to complete the cell reselection according to the cell signal quality of the neighbor cell 1, the neighbor cell 2 and the neighbor cell 3.

The cell signal quality may be represented by the signal quality of a synchronization signal sent by the corresponding neighbor cell, the signal quality of a demodulation reference signal, or the signal quality of a channel state information reference signal.

The stronger signal quality shows that the terminal may obtain the better communication quality after accessing the cell.

The signal quality may be reflected by Reference Signal Received Power (RSRP), Reference Signal Received Quality (RSRQ), Signal to Interference plus Noise Ratio (SINR), and the like.

In some embodiments, when there are the plurality of neighbor cells with the largest number of the same type as the network slices supported by the terminal, the signal quality of these neighbor cells is sorted, and the neighbor cell with the best signal quality is prioritized for cell reselection. When the cell reselection for one neighbor cell fails, other neighbor cells with the largest number of the same type as the network slice supported by the terminal are traversed until the cell reselection is successful or all the neighbor cells with the largest number of the same type as the network slice supported by the terminal are traversed.

In some embodiments, receiving the system message includes:

SIB3 and/or SIB4 are/is received.

In some embodiments, SIB3 may be originally configured to indicate common-frequency cell selection and reselection parameters. In the embodiment of the present disclosure, the network slice information of the neighbor cell may be directly carried in the SIB3, so that the terminal knows a network slice type supported by the common-frequency neighbor cell when receiving the SIB3.

In some embodiments, SIB3 may be configured to indicate the common-frequency cell selection and reselection parameters of the neighbor cell. In some embodiments, the SIB3 may further carry a list of cells that are forbidden to access.

SIB4 may be originally configured to indicate inter-frequency cell selection and reselection parameters.

The cell selection and reselection parameters may include: cell selection and reselection threshold parameters. The threshold parameters may be configured to be compared with the cell signal quality measured by the terminal, so that the terminal selects or reselects the cell according to a comparison result.

The above threshold parameters are only examples, and the cell selection and reselection parameters may include various parameters, and are not limited to the above threshold parameters.

In some embodiments, the network slice information includes at least one of the followings:

type information of the network slice supported by the neighbor cell; and slice identification information of the network slice supported by the neighbor cell.

The network slice identification information includes but is not limited to Single Network Slice Selection Assistance Information (S-NSSAI).

A network slice identifier is an important parameter in the network slice technology. The Single Network Slice Selection Assistance Information (S-NSSAI) uniquely identifies one network slice.

An optional Information Element (IE) or a mandatory information element may be added to a system message block such as SIB3 or SIB4. The optional information element or the mandatory information element here may be configured to carry the network slice information supported by the neighbor cell.

The network slice information is carried in SIB3 or SIB4, so that the terminal will simultaneously receive the network slice information when receiving the parameters for cell reselection carried in SIB3 or SIB4. In this way, there is no need to receive separately, and power consumption and cumbersome operations generated by separate receiving of the terminal are reduced.

As shown in FIG. 4, the present embodiment provides a cell reselection method. The cell reselection method is performed by a base station, and includes:

S310: a system message is sent. The system message includes network slice information of a network slice supported by a neighbor cell, and the network slice information is used for a terminal to perform cell reselection.

In the present embodiment, the base station may be various types of base stations, for example, a 4G base station and/or a 5G base station.

The base station may send the system message, and the system message will carry the network slice information of the network slice supported by the neighbor cell. The network slice information may at least include: various information that can indicate the type of the network slice supported by the neighbor cell, for example, network slice type information or slice identification information that can indirectly indicate the type of the network slice.

In some embodiments, the network slice information includes: type information of the network slice supported by the neighbor cell.

In some other embodiments, the network slice information includes at least one of the followings: the type information of the network slice supported by the neighbor cell; and the slice identification information of the network slice supported by the neighbor cell.

In some embodiments, S310 may include:
system message blocks SIB3 and/or SIB4 are/is sent.

As shown in FIG. 5, the present embodiment provides a cell reselection apparatus, configured in a terminal, and including:
  a receiving module 510, configured to receive a system message, in which the system message includes network slice information of a network slice supported by a neighbor cell; and
  a reselecting module 520, configured to perform cell reselection according to the network slice information.

In some embodiments, the receiving module 510 and the reselecting module 520 may be a program module, which can implement system message reception and cell reselection after being executed by a processor.

In some other embodiments, the receiving module 510 and the reselecting module 520 may be a module combining software and hardware, which may include various programmable arrays. The programmable arrays include but are not limited to a complex programmable array or a field programmable array.

In further some other embodiments, the receiving module 510 and the reselecting module 520 may include a pure hardware module, which may include various application-specific integrated circuits.

In some embodiments, the reselecting module 520 is configured to select a neighbor cell having a highest type contact ratio with the network slice supported by the terminal to perform cell reselection according to the network slice information.

In some embodiments, the reselecting module 520 is configured to select the neighbor cell with the largest number of the same type as the network slice supported by the terminal to perform cell reselection according to the network slice information.

In some embodiments, the reselecting module 520 is further configured to select a neighbor cell with a best cell signal quality among the neighbor cells with the largest number of the same type as the network slice supported by the terminal to perform cell reselection in response to determining that there are more than one neighbor cell with the largest number of the same type as the network slice supported by the terminal.

In some embodiments, the receiving module 510 is configured to receive SIB3 and/or SIB4.

In some embodiments, the network slice information includes at least one of the followings:
  type information of the network slice supported by the neighbor cell; and
  slice identification information of the network slice supported by the neighbor cell.

As shown in FIG. 6, the present embodiment provides a cell reselection apparatus, configured in a base station, and including:
  a sending module 610, configured to send a system message, in which the system message includes network slice information of a network slice supported by a neighbor cell, and the network slice information is used for a terminal to perform cell reselection.

In some embodiments, the sending module 610 may be a program module, which can implement system message sending after being executed by a processor.

In some other embodiments, the sending module 610 may be a module combining software and hardware, which may include various programmable arrays. The programmable arrays include but are not limited to a complex programmable array or a field programmable array.

In further some other embodiments, the sending module 610 may include a pure hardware module, which may include various application-specific integrated circuits.

In some embodiments, the cell reselection apparatus may further include: a storage module, configured to store the system message to be sent.

In some embodiments, the sending module 610 is configured to send SIB3 and/or SIB4.

In some embodiments, the network slice information includes at least one of the followings:
  type information of the network slice supported by the neighbor cell; and
  slice identification information of the network slice supported by the neighbor cell.

The present embodiment provides a cell reselection method, and a base station simultaneously broadcasts a network slice type supported by a neighbor cell in a system message for cell reselection. For example, an information element about the slice type of the neighbor cell is added in SIB3. A terminal in an idle state or an inactive state reads a system message of a current cell about the neighbor cell, and learns a type of a network slice supported by each neighbor cell. When performing cell reselection, the terminal preferentially selects the cell with the highest type contact ratio with the network slice supported by the terminal for resident. If there are the plurality of cells having the same number of network slices that overlap with the network slice type supported by the terminal, the plurality of cells are sorted according to the signal quality, and the cell with the best signal quality is preferentially selected for resident.

In a word, the base station simultaneously broadcasts the network slice type supported by the neighbor cell in the system message for cell reselection, for example, an information element about the slice type of the neighbor cell is added in SIB3.

An embodiment of the present disclosure further provides a communication device, including:
- a transceiver;
- a memory; and
- a processor, connected with the transceiver and the memory respectively, configured to control wireless signal transceiving of the transceiver and implement the cell reselection method provided by any aforementioned embodiment by executing a computer executable instruction stored on the memory, for example, the cell reselection method shown by any one of FIG. 2 to FIG. 4.

The communication device may include: the aforementioned terminal or base station.

A sixth aspect of an embodiment of the present disclosure further provides a computer readable storage medium, and the computer readable storage medium stores a computer executable instruction. The computer executable instruction, after being executed by a processor, can implement the cell reselection method provided by any aforementioned embodiment, for example, the cell reselection method shown by any one of FIG. 2 to FIG. 4.

FIG. 7 is a terminal shown according to an example. The terminal may be a mobile phone, a computer, a digital broadcast terminal, a message transceiving device, a game console, a tablet device, a medical device, a fitness device, a personal digital assistant, and the like.

Referring to FIG. 7, an apparatus 800 may include one or more of the following components: a processing component 802, a memory 804, an electrical component 806, a multimedia component 808, an audio component 810, an input/output (I/O) interface 812, a sensor component 814, and a communication component 816.

The processing component 802 usually controls overall operation of the apparatus 800, such as operations associated with displaying, telephone calling, data communication, a camera operation and a record operation. The processing component 802 may include one or more processors 820 to execute an instruction, so as to complete all or part of steps of the above method performed by a terminal. In addition, the processing component 802 may include one or more modules, so as to facilitate interaction between the processing component 802 and other components. For example, the processing component 802 may include a multimedia module, so as to facilitate interaction between the multimedia component 808 and the processing component 802.

The memory 804 is configured to store various types of data so as to support operations on the apparatus 800. Examples of these data include instructions of any application program or method configured to be operated on the apparatus 800, contact data, telephone directory data, messages, pictures, videos, and the like. The memory 804 may be implemented by any type of volatile or nonvolatile storage device or their combinations, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The electrical component 806 provides electric power for various components of the apparatus 800. The electrical component 806 may include a power management system, one or more power sources, and other components associated with generating, managing and distributing electric power for the apparatus 800.

The multimedia component 808 includes a screen providing an output interface between the apparatus 800 and a user. In some examples, the screen may include a liquid crystal display (LCD) and a touch panel (TP). If the screen includes the touch panel, the screen may be implemented as a touch screen so as to receive an input signal from the user. The touch panel includes one or more touch sensors to sense touching, swiping and gestures on the touch panel. The touch sensor may not only sense a boundary of a touching or swiping action, but also detect duration and pressure related to the touching or swiping operation. In some embodiments, the multimedia component 808 includes a front camera and/or a back camera. When the apparatus 800 is in an operation mode, such as a shooting mode or a video mode, the front camera and/or the back camera may receive external multimedia data. Each front camera and each back camera may be a fixed optical lens system or have a focal length and optical zooming capability.

The audio component 810 is configured to output and/or input an audio signal. For example, the audio component 810 includes a microphone (MIC). When the apparatus 800 is in the operation mode, such as a call mode, a recording mode or a speech recognition mode, the microphone is configured to receive an external audio signal. The received audio signal may be further stored in the memory 804 or sent via the communication component 816. In some embodiments, the audio component 810 further includes a speaker for outputting an audio signal.

The I/O interface 812 provides an interface between the processing component 802 and a peripheral interface module, and the above peripheral interface module may be a keyboard, a click wheel, buttons, etc. These buttons may include but are not limited to: a home button, a volume button, a start button and a lock button.

The sensor component 814 includes one or more sensors for providing state evaluations of various aspects for the apparatus 800. For example, the sensor component 814 may detect an on/off state of the apparatus 800 and relative positioning of components, for example, the components are a display and a keypad of the apparatus 800. The sensor component 814 may further detect position change of the apparatus 800 or one component of the apparatus 800, whether there is contact between the user and the apparatus 800, azimuth or speed up/speed down of the apparatus 800, and temperature change of the apparatus 800. The sensor component 814 may include a proximity sensor, which is configured to detect existence of a nearby object without any physical contact. The sensor component 814 may further include an optical sensor, such as a CMOS or CCD image sensor, for use in imaging application. In some embodiments, the sensor component 814 may further include an acceleration sensor, a gyroscope sensor, a magnetic sensor, a pressure sensor or a temperature sensor.

The communication component 816 is configured to facilitate wired or wireless communication between the apparatus 800 and other devices. The apparatus 800 may access a wireless network based on a communication standard, such as WiFi, 2G or 3G, or their combination. In an example, the communication component 816 receives a broadcast signal or broadcast related information from an external broadcast management system via a broadcast channel. In an example, the communication component 816 further includes a near-field communication (NFC) module so as to facilitate short-range communication. For example, the NFC module may be implemented based on a radio frequency identification (RFID) technology, an infrared data association (IrDA) technology, an ultra wide band (UWB) technology, a Bluetooth (BT) technology and other technologies.

In the example, the apparatus 800 may be implemented by one or more application specific integrated circuits (ASICs), digital signal processors (DSPs), digital signal processing devices (DSPDs), programmable logic devices (PLDs), field-programmable gate arrays (FPGAs), controllers, microcontrollers, microprocessors or other electronic elements for executing the above method performed by the terminal.

In the example, a non-transitory computer readable storage medium including instructions is further provided, such as a memory 804 including instructions. The above instructions may be executed by a processor 820 of the apparatus 800 so as to complete the above method. For example, the non-transitory computer readable storage medium may be an ROM, a random access memory (RAM), a CD-ROM, a magnetic tape, a floppy disk, an optical data storage device and the like.

FIG. 8 is a schematic diagram of a base station. Referring to FIG. 8, an apparatus 900 includes a processing component 922, which further includes one or more processors, and a memory resource represented by a memory 932, for storing instructions executable by the processing component 922, such as an application program. An application program stored in the memory 932 may include one or more modules, each corresponding to a set of instructions. In addition, the processing component 922 is configured to execute the instructions to execute the method performed by the base station.

The base station 900 may further include a power supply component 926 configured to execute power management of the apparatus 900, a wired or wireless network interface 950 configured to connect the apparatus 900 to a network, and an input/output (I/O) interface 958. The apparatus 900 may operate based on an operating system stored in a memory 932, such as Windows Server™, Mac OS X™, Unix™, Linux™, FreeBSD™ or the like.

In the example, a non-transitory computer readable storage medium including instructions is further provided, such as a memory 932 including instructions. The above instructions may be executed by a processor of the apparatus 900 so as to complete the above method. For example, the non-transitory computer readable storage medium may be an ROM, a random access memory (RAM), a CD-ROM, a magnetic tape, a floppy disk, an optical data storage device and the like.

What is claimed is:

1. A cell reselection method, comprising:
   receiving a system message of a current cell by a terminal, wherein the system message comprises network slice information of a network slice supported by a neighbor cell of the current cell, wherein the network slice information comprises type information of the network slice supported by the neighbor cell, and the system message comprises a system information block (SIB)3 or an SIB4; and
   performing cell reselection by the terminal according to only the network slice information, wherein performing cell reselection by the terminal according to only the network slice information comprises: selecting a neighbor cell with a largest number of a same type as the network slice supported by the terminal according to only the network slice information to perform cell reselection.

2. The method according to claim 1, wherein selecting the neighbor cell having the highest type contact ratio with the network slice supported by the terminal according to the network slice information to perform cell reselection further comprises:
   selecting a neighbor cell with a best cell signal quality among the neighbor cells with the largest number of the same type as the network slice supported by the terminal to perform cell reselection, in response to determining that more than one neighbor cells with the largest number of the same type as the network slice are supported by the terminal.

3. A non-transitory computer readable storage medium, storing a computer executable instruction, wherein the computer executable instruction, after being executed by a processor, can implements the cell reselection method according to claim 1.

4. A cell reselection method, comprising:
   sending a system message of a current cell by a base station, wherein the system message comprises network slice information of a network slice supported by a neighbor cell of the current cell, and the network slice information is configured for a terminal to perform cell reselection, according to only the network slice information, wherein the network slice information comprises type information of the network slice supported by the neighbor cell, and the system message comprises a system information block (SIB)3 or an SIB4, wherein the network slice information is further configured for the terminal to select a neighbor cell with a largest number of a same type as the network slice supported by the terminal according to only the network slice information to perform cell reselection.

5. A communication device, comprising:
   a transceiver;
   a memory; and
   a processor, connected with the transceiver and the memory respectively, configured to control wireless signal transceiving of the transceiver and implement the cell reselection method according to claim 4 by executing a computer executable instruction stored on the memory.

6. A non-transitory computer readable storage medium, storing a computer executable instruction, wherein the computer executable instruction, after being executed by a processor, can-implements the cell reselection method according to claim 4.

7. A communication device, comprising:
   a transceiver;
   a memory; and
   a processor, connected with the transceiver and the memory respectively, configured to control wireless signal transceiving of the transceiver and implement the following operations by executing a computer executable instruction stored on the memory:
   receiving a system message of a current cell, wherein the system message comprises network slice information of a network slice supported by a neighbor cell of the current cell, wherein the network slice information comprises type information of the network slice supported by the neighbor cell, and the system message comprises a system information block (SIB)3 or an SIB4; and performing cell reselection according to only the network slice information;

wherein the processor is further configured to:

select a neighbor cell with a largest number of a same type as the network slice supported by the terminal according to only the network slice information to perform cell reselection.

8. The communication device according to claim 7, wherein the processor is further configured to:

select a neighbor cell with a best cell signal quality among the neighbor cells with the largest number of the same type as the network slice supported by the terminal to perform cell reselection, in response to determining that more than one neighbor cells with the largest number of the same type as the network slice are supported by the terminal.

* * * * *